Figure 1:
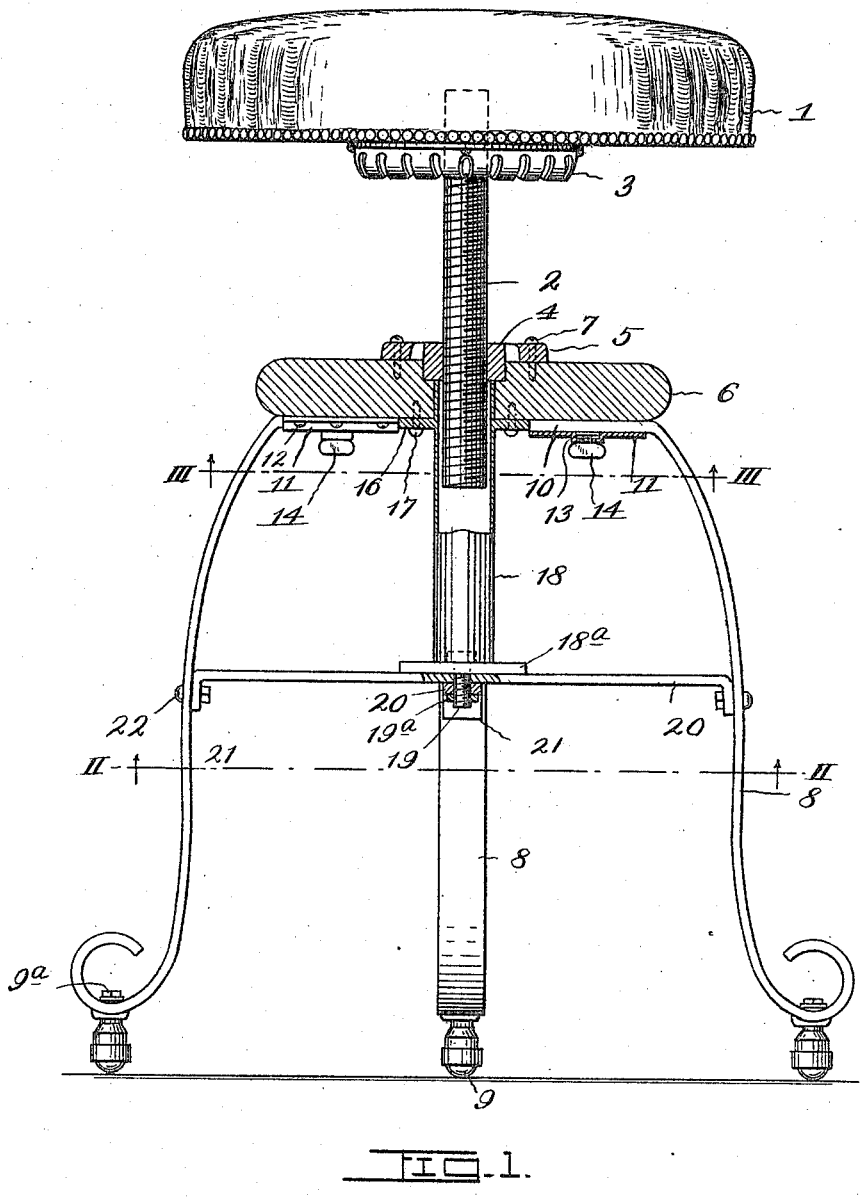

J. F. SPALDING.
REVOLVING TOP LEG DETACHABLE STOOL.
APPLICATION FILED SEPT. 16, 1915.

1,184,886.

Patented May 30, 1916.
2 SHEETS—SHEET 1.

Inventor:
James F. Spalding,
By F. G. Fischer
Attorney

Witnesses
Fred C. Fischer,
L. J. Fischer

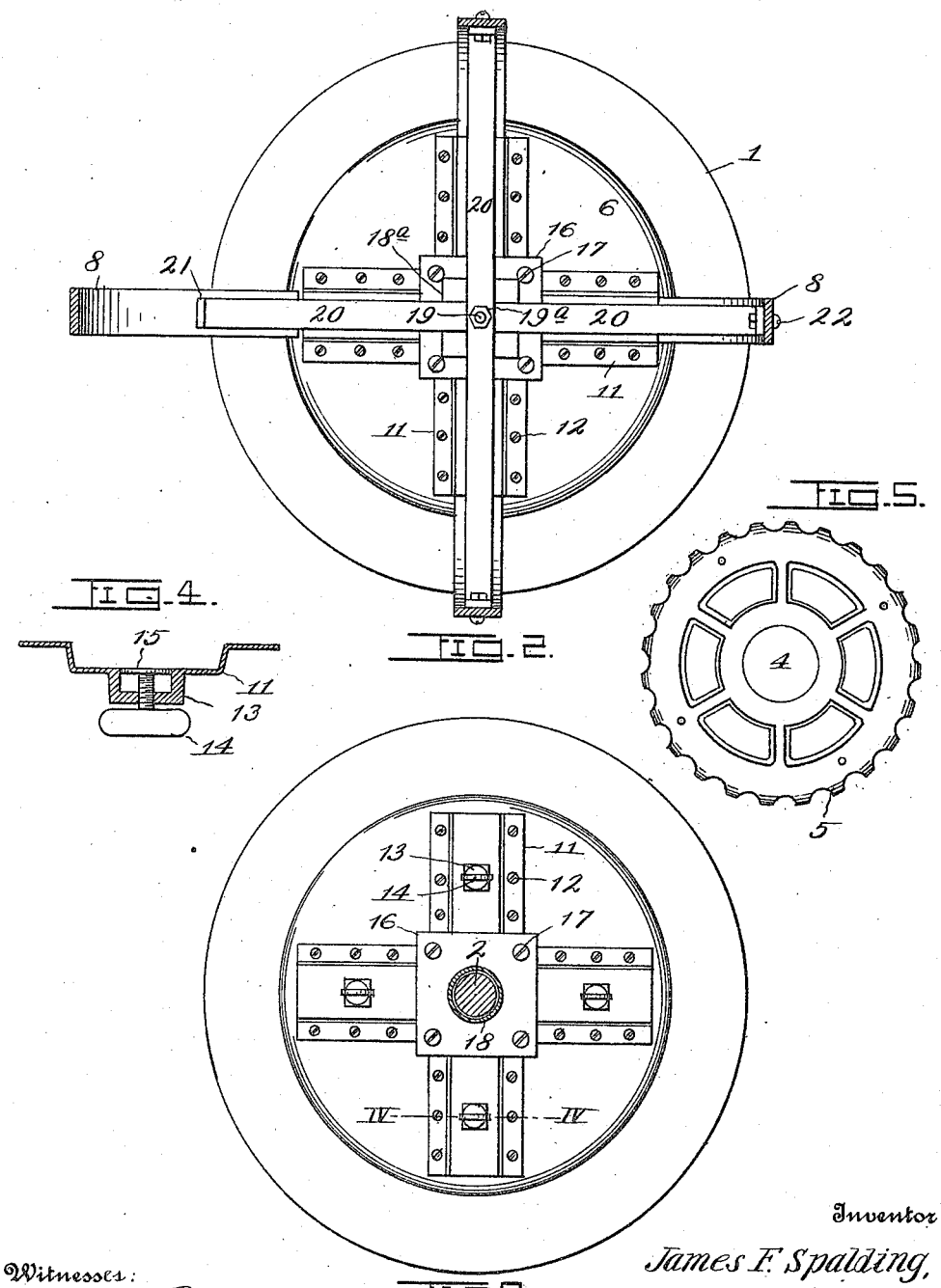

UNITED STATES PATENT OFFICE.

JAMES F. SPALDING, OF KANSAS CITY, MISSOURI.

REVOLVING-TOP LEG-DETACHABLE STOOL.

1,184,886. Specification of Letters Patent. Patented May 30, 1916.

Application filed September 16, 1915. Serial No. 50,977.

*To all whom it may concern:*

Be it known that I, JAMES F. SPALDING, a citizen of the United States, residing at Kansas City, in the county of Jackson and State of Missouri, have invented certain new and useful Improvements in Revolving-Top Leg-Detachable Stools, of which the following is a specification.

My invention relates to improvements in stools, and one object is to provide a revolving top stool which may be employed to advantage as a piano stool, an office stool, a tourist stool, or in any capacity in which a stool of this character may be used.

A further object is to provide a stool which can be readily taken apart and placed in knockdown form for shipment or storage in a small space.

Other objects of the invention will hereinafter appear and in order that said invention may be fully understood, reference will now be made to the accompanying drawings, in which:

Figure 1 is a side elevation, partly in section, of a stool embodying the invention. Fig. 2 is an inverted cross section on line II—II of Fig. 1, with one of the legs removed from its socket. Fig. 3 is an inverted cross section on line III—III of Fig. 1, with the legs removed. Fig. 4 is a cross section of a socket and a set screw, on line IV—IV of Fig. 3. Fig. 5 is a plan view of a nut employed in carrying out the invention.

Referring now in detail to the different parts, 1 designates a seat, which is, preferably, upholstered to render it both ornamental and comfortable. 2 designates a screw for supporting said seat 1, to the underside of which it is secured through the intermediacy of a cap 3, cast or otherwise rigidly connected to the upper portion of the screw.

4 designates a nut in which the screw 2 operates to adjust the seat 1 vertically. Said nut 4 has a marginal flange 5 which is secured to a disk 6, of wood or other suitable material, by screws 7. The disk 6 is supported by a plurality of removable legs 8 consisting, preferably, of metal and curved to lend ornamentation to the stool. Each leg 8 is supported upon a ball caster 9, so that the stool can be readily moved around over the surface of a floor. Nut washers $9^a$ are employed to secure the shanks of the ball casters 9 to the lower portions of the legs 8.

The upper ends 10 of the legs 8 are bent to a horizontal plane for the purpose of fitting into sockets 11, secured by suitable means such as screws 12, to the underside of the disk 6. Each socket 11 has an integral nut portion 13 into which a set screw 14 is threaded. Said set screw 14 is provided at its upper end with a flange 15, to abut the horizontal portion 10 of the leg and to prevent the set screw 14 from being withdrawn from the nut portion 13. The adjacent ends of the sockets 11 abut a rectangular plate 16 secured to the underside of the disk 6 by suitable means, such as screws 17. The plate 16 is formed integral with or otherwise rigidly secured to the upper portion of a tubular sheath 18 extending downwardly from the nut 4 to inclose that portion of the screw 2 extending below said nut 4. The lower end of the sheath 18 is closed by a rectangular cap $18^a$, provided with a depending stud bolt 19, which extends through registering holes in the central portions of a pair of braces 20, crossed at their intersecting portions and bent at rightangles at their terminals 21, to bear against the inner surface of the legs 8, which are removably secured thereto by bolts 22. The lower end of the stud bolt 19 is engaged by a nut washer $19^a$, which is screwed up against the underside of the lowermost brace 20, to lock the parts together.

When it is desired to dismantle the stool for shipment or storage the seat 1 is removed by revolving the same until the screw 2 is withdrawn from the nut 4. The set screws 14 are then loosened and the bolts 22 are removed, so that the legs 8 can be withdrawn from the sockets 11. The nut washer $19^a$ is then removed, so that the braces 20 can be taken off the stud bolt 19.

From the foregoing description, it will be readily understood that I have produced a stool embodying the features of advantage above enumerated, and while I have shown and described the preferred form of my invention, I reserve the right to make such changes in the construction, arrangement and proportion of parts as properly fall within the spirit and scope of the claims.

Having thus described my invention, what I claim and desire to secure by Letters Patent, is:

1. In a stool, a disk, a tubular sheath having its upper end extending partly up into the disk, a nut extending down into the disk and seated on the top edge of the sheath, a rectangular plate secured to the sheath and disposed beneath and secured to the disk, sockets for the respective sides and ends of the plate secured to the under side of the disk having their inner ends closed by the respective sides and ends of the plate, legs having upper ends removably secured in the sockets, a cap closing the lower end of the sheath, and having a depending stud, a pair of crossed braces for the legs, said braces at their points of crossing having registering apertures through which the stud extends, and means to secure the braces to the stud.

2. In a stool, a disk, a tubular sheath, a plate secured to the sheath and to the disk and disposed beneath the latter, sockets secured to the under face of the disk and having their inner ends closed by parts of the plate, the latter being common to all of the sockets, legs having upper portions removably secured in the sockets, braces for the legs, and means to secure the braces to the lower end of the sheath.

In testimony whereof I affix my signature, in the presence of two witnesses.

JAMES F. SPALDING.

Witnesses:
F. G. FISCHER,
L. J. FISCHER.

Copies of this patent may be obtained for five cents each, by addressing the "Commissioner of Patents, Washington, D. C."